United States Patent [19]
Huber et al.

[11] Patent Number: 6,130,516
[45] Date of Patent: *Oct. 10, 2000

[54] PROCESS AND DEVICE FOR MONITORING OBJECTS

[75] Inventors: Manfred Huber, Balgheim; Klaus Juengling, Tuttlingen, both of Germany; Bruce Wm. Behling, Hartland, Wis.

[73] Assignee: Leukhardt Systemelektronik GmbH, Tuttlingen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/219,540

[22] Filed: Mar. 29, 1994

[30] Foreign Application Priority Data

Apr. 2, 1993 [DE] Germany .............................. 43 10 872

[51] Int. Cl.⁷ .................................................. G05B 19/25
[52] U.S. Cl. ......................... 318/572; 318/570; 318/602; 318/603
[58] Field of Search .................................... 318/572, 569, 318/567, 563, 628, 632, 571, 600–605

[56] References Cited

U.S. PATENT DOCUMENTS

| | | | |
|---|---|---|---|
| 3,940,675 | 2/1976 | Schroeder | 318/572 X |
| 4,214,191 | 7/1980 | Watanabe et al. | 318/572 X |
| 4,233,491 | 11/1980 | Maruyama et al. | 318/572 X |
| 4,334,178 | 6/1982 | Lipp | 318/572 |
| 4,831,315 | 5/1989 | Hammond et al. | 318/572 X |
| 4,899,094 | 2/1990 | Pilborough | 318/567 |
| 4,901,253 | 2/1990 | Iwano et al. | 364/522 |
| 4,974,165 | 11/1990 | Locke et al. | 318/572 X |
| 5,189,806 | 3/1993 | McMurtry et al. | 33/503 |

FOREIGN PATENT DOCUMENTS

| | | |
|---|---|---|
| 30 03 431 | 8/1981 | Germany . |
| 3003431 | 10/1982 | Germany . |
| 3837526 | 12/1989 | Germany . |
| 64-153149 | 1/1991 | Japan . |
| WO 92/21470 | 12/1992 | WIPO . |

*Primary Examiner*—David Martin
*Attorney, Agent, or Firm*—Jacobson, Price, Holman & Stern, PLLC

[57] ABSTRACT

Described are a process and a device for monitoring objects, such as tools or process areas. A feeler pin (34) can be pivoted by means of an electric motor (20) in both directions of rotation, starting from a zero position, so that two objects or process areas can be monitored. The zero position of the feeler pin (34) is determined by means of the microcomputer in a teach-in cycle, starting from the desired angular value of a reference stop.

3 Claims, 2 Drawing Sheets

PROCESS AND DEVICE FOR MONITORING OBJECTS

BACKGROUND OF THE INVENTION

The invention relates to a process for monitoring objects, such as especially tools, or process areas, and a device for implementing the process.

It is known from the DE 30 03 431 C2 to monitor tools at machine tools, e.g. drills, by means of a feeler pin. The feeler pin is pivoted against the tool between the work cycles in order to check its presence and operativeness. The feeler pin sits on a shaft driven by an electric motor. The pivot angle of the feeler pin is defined by a shaft encoder. In an initialization and learning cycle (hereinafter referred to as a "teach-in" cycle) the feeler pin is pivoted against a reference stop, e.g. against an object to be monitored, whereby the angular position of this reference stop is stored as the desired angular value in a microcomputer. In the next monitoring cycle the pivot angle of the feeler pin that is determined by the shaft encoder is defined and the actual angular value, at which the feeler pin strikes the object to be monitored is compared with the stored desired angular value. If the two values agree, a good message is sent; if they deviate, a fault message is sent. If the device is used for monitoring a process area (free space monitoring), the good message is sent when the feeler pin can pass over the angular range of the process area. A fault message is sent, when the feeler pin strikes an impediment in the process area.

In the case of the prior art monitoring operation, the zero position of the feeler pin is fixed by a mechanical zero stop. The pivoting angle of the feeler pin is counted by means of the shaft encoder from this zero stop. When the feeler pin strikes the object to be monitored or the end of the process area, the electric motor's direction of rotation is reversed, e.g. by reversing the polarity of the d.c. electric motor that is used in order to swing the feeler pin back again into the zero position.

In the known device the feeler pin can be pivoted from the zero position only in one direction of rotation. The respective polarity of the electric motor gives the information concerning the pivoting direction of the feeler pin. Thus, the possible applications of the device are limited. When the feeler pin is reset into the zero position, the mechanical zero stop is approached. The associated mechanical stress affects the lifespan of the device.

SUMMARY OF THE INVENTION

The invention is based on the problem of providing a process and a device for monitoring objects or process areas, thus enabling a more diverse and flexible use and longer service life.

According to the invention, a shaft encoder is used that measures not only incrementally the pivoting angle, but also recognizes the pivoting direction of the feeler pin. The zero position of the feeler pin is not defined by a mechanical zero stop, but rather is calculated and stored by means of a microcomputer or suitable logic modules (application specific integrated circuits [ASIC] etc.), starting from the desired angular value of the reference stop. Since no mechanical zero stop is present or necessary and since the shaft encoder determines not only the pivoting angle, but also the pivoting direction of the feeler pin, it is possible to pivot the feeler pin from the zero position to the right and to the left in both pivoting directions. Thus, two objects or two process areas can be monitored right and left from the zero position of the feeler pin by means of a single feeler pin.

Since the zero position is determined according to the software of the microcomputer, a mechanical zero stop is not approached during each scanning cycle, so that the lifespan of the device is significantly improved.

Since the zero position is determined by the software, the zero position can be freely selected. Thus, the device can be adapted very flexibly to suitable application problems. The zero position can be selected in such a manner that the pivoting angle of the feeler pin from the zero position to a stop at the object to be monitored is kept as small as possible, on the one hand, and can be chosen sufficiently large, on the other hand, to pivot the feeler pin reliably out of the working area during the work cycle. If two objects are monitored to the right and left of the zero position, the zero position between the two desired angular values can be fixed in such a manner that auxiliary periods for monitoring are minimal. If the two objects to be monitored are identical, for example, two tools of a machine tool, the zero position is fixed preferably symmetrically in the center between the two desired angular values, i.e. the positions of the two tools.

The device enables the monitoring of an object in a predetermined angular position, e.g. a tool, or the monitoring of a process area with a predetermined angular range (free space monitoring). In addition, the recognition of the pivoting direction of the feeler pin by means of the shaft encoder also enables its employment for measuring angles, i.e. measuring the pivoting angle from the zero position to the position of an object in a variable angular position. To this end, a permanently installed reference stop is used that is approached in the teach-in cycle and establishes a starting position having an angular value of zero. The angle to the object can also be measured starting from this zero position.

BRIEF DESCRIPTION OF THE INVENTION

In the following the invention is explained in detail with reference to the embodiment shown in the attached drawings.

FIG. 1 is a perspective view of a partially cut away scanning head of the device; and FIG. 2 is a block diagram of the entire device.

DESCRIPTION OF THE PREFERRED EMBODIMENT

The device comprises a scanning head 10 and a controller 12. The scanning head 10 is attached directly to the object to be monitored or to the process area to be monitored, for example, next to the tool to be monitored, e.g. a drill, of a machine tool. The controller 12 can be disposed at a distance in order to be protected, for example, from the assault of chips, coolant and lubricant. The scanning head 10 and the controller 12 are connected together via a cable 14.

Figure 1:
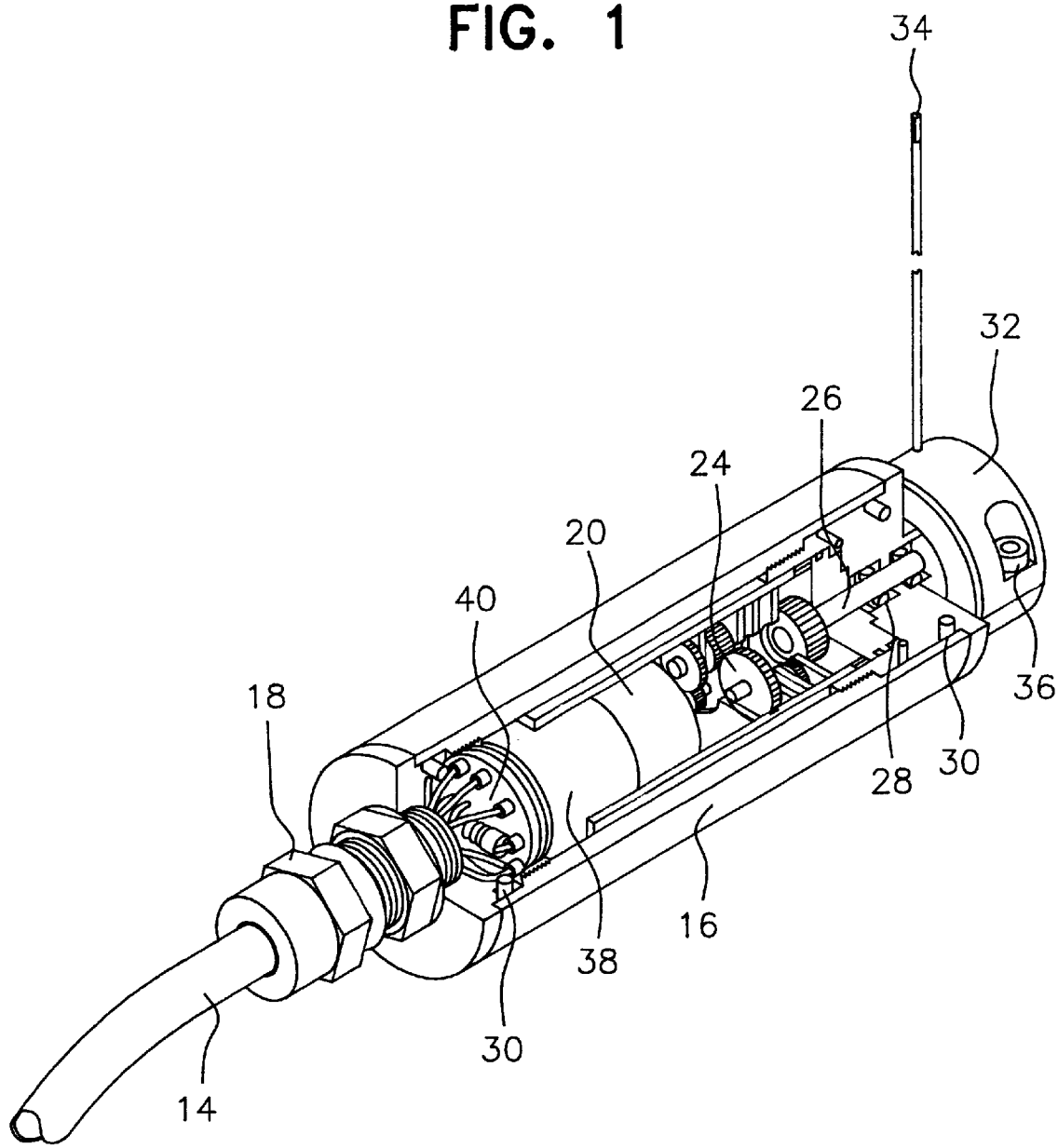
Figure 2:
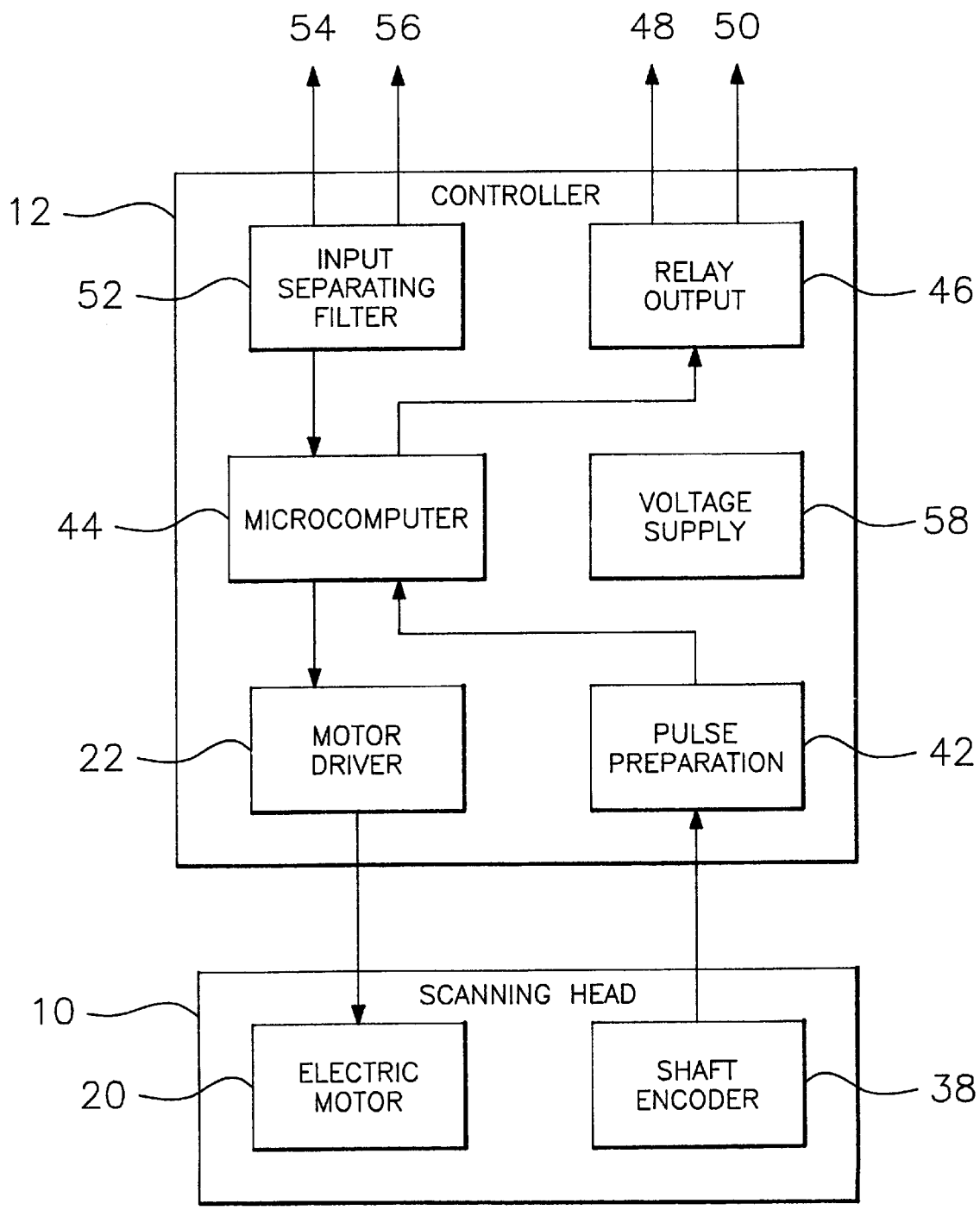

The scanning head 10 shown in FIG. 1 exhibits a cylindrical housing 16, which is sealed against chips, coolant and lubricant and similar disturbing influences. The cable 14 for connecting to the controller 12 is attached to the scanning head 10 by means of a screwable connector 18. In the housing 16 there is an electric motor 20, which is designed as a d.c. motor. The electric motor 20 is fed so as to reverse the polarity by means of a motor driver 22, disposed in the controller 12, via the cable 14. The electric motor 20 drives by way of a precision tooth gearing 24 a shaft 26, which is run coaxially on the face side out of the housing 16. A double lip seal 28 seals the passage of the shaft 26 through the face-sided cover of the housing 16 against chips and coolant. O-ring seals 30 seal the respective face-sided cover of the cylindrical housing 16. A pin holder 32, into which a feeler pin 34 can be clamped, is clamped via a setscrew 36 on the stump of the shaft 26 that projects beyond the housing 16. The feeler pin 34 that is clamped into the pin holder 32 protrudes radially from the shaft 26.

On the cable side of the electric motor 20 a shaft encoder 38, which determines the angular position of the shaft of the electric motor 20, is disposed in the housing 16. A plate 40 holds the electronic for receiving and amplifying the measured values of the shaft encoder 38. The plate 40 is connected to the controller 12 by way of the connector 18 and the cable 14. The shaft encoder 38 is a well-known incremental, optical, or magnetic shaft encoder, which exhibits the ability to detect the direction of rotation, preferably on the basis of two signals that are out of phase by 90°.

The pulses of the shaft encoder 38 are fed via the cable 14 to the controller 12, in which they are fed to a microcomputer 44 following a pulse preparation 42. The microcomputer 44 controls, on the one hand, via the motor driver 22 the electric motor 20 and sends, on the other hand, via the relay output 46 good messages 48 or fault messages 50. A start signal 54 for a teach-in cycle or a start signal 56 for the scanning cycle is fed to the microcomputer 44 via an input separating filter 52. Furthermore, a voltage supply 58 is disposed in the controller 12.

The monitoring operation functions in the following manner.

The scanning head 10 is mounted between two objects to be monitored, for example, the drills of two adjacent tool spindles, so that the two objects to be monitored are located in the pivoting range of the feeler pin 34.

At this stage the start signal for the teach-in cycle is applied to the input 54. Owing to this start signal 54 the microcomputer 44 steers the electric motor 20 first in one direction of rotation, so that the feeler pin 34 is pivoted, for example, to the right. As soon as the feeler pin 34 strikes the first object, the angular position of the feeler pin is stored as the desired angular value of the first object in the microcomputer 44. Now the microcomputer 44 reverses the direction of rotation of the electric motor 20, so that the feeler pin 34 is pivoted to the left in the reversed direction. As soon as the feeler pin 34 strikes the second object during this pivoting motion, its angular position is stored as the second desired angular value in the microcomputer 44. From the desired angular values of the two objects and the pivoting angle, which is determined by the shaft encoder and lies between these two desired angular values, the microcomputer 44 calculates the zero position of the feeler pin 34, which lies preferably in the center between the two desired angular values. Now the feeler pin 34 is pivoted into this calculated zero position, thus terminating the teach-in cycle.

Finally by applying a start signal to the input 56, a scanning cycle can be started. The start signal 56 comes, for example, from the machine tool following each work cycle in order to test the operativeness of the tools.

As soon as the start signal 56 is fed to the microcomputer 44, it starts the electric motor 20 in the first direction of rotation, so that the feeler pin 34 is moved, for example, to the right. In so doing, the pivoting angle is measured by means of the shaft encoder 38. When the feeler pin 34 strikes the first object to be monitored, the microcomputer 44 compares the actual angular value with the desired angular value stored for this first object. The direction of rotation of the electric motor 20 is commutated, so that the feeler pin 34 moves now to the left in the reversed direction. When the feeler pin 34 strikes the second object, the actual angular value is compared again by means of the microcomputer 44 with the desired angular value stored for this second object. If the actual angular value agrees with the stored desired angular value for both objects, the good message 48 is switched via the relay output 46 through the microcomputer 44. If the result for the one object or both objects is a deviation from the actual angular value and the desired angular value, the microcomputer 44 switches via the relay output 46 the fault message 50. The good message 48 can be used, for example, to start the next work cycle of the machine tool, whereas the fault message 50 interrupts the work cycle of the machine tools.

It is readily obvious that the described teach-in and scanning cycles do not necessarily assume two objects to be monitored. Instead of one object or two objects to be monitored, one process area can also be monitored to the effect that no disturbing impediment is located in the region of this process area. In this case, instead of the object to be monitored, an end stop is used at the end of the angular range of the process area to be monitored as the reference stop for the desired angular value of the teach-in cycle and as the stop for the actual angular value during the scanning cycle.

It is readily obvious that two objects do not necessarily have to be monitored. If only one object or one process area is to be monitored, the second reference stop can be a mechanical stop attached stationarily in the scanning head. However, this mechanical stop is approached only once as the reference stop in the teach-in cycle. During the scanning cycles the feeler pin 34 pivots from this zero position, which exhibits no mechanical stop.

If the device is to be used for measuring angles, then the zero position for the feeler pin 34 can also be calculated in a teach-in cycle from the desired angular value of a reference stop installed into the scanning head 10. The microcomputer 44 measures then incrementally the pivoting angle of the feeler pin 34 starting from the zero position, which is calculated in this manner, in the opposite pivoting direction.

The measurement of the angle enables not only repeated monitoring of the same angle as required for monitoring tools, but also the measurement of different angles during successive measurements. Similarly angular measurements of the difference are possible.

What is claimed is:

1. A process for monitoring the position of objects having solid surfaces using a monitoring device wherein the monitoring device includes an electric motor, a shaft rotatably driven by said electric motor, an encoder for detecting a degree of rotation of said shaft, a microcomputer for storing and interpreting data received from said encoder and for controlling said electric motor, and a feeler pin connected to said shaft; the process comprising:

positioning said feeler pin between a first and a second of said objects having solid surfaces;

rotating said shaft in a first direction until said feeler pin contacts said first object;

measuring a first degree of rotation of said shaft with said encoder during said rotation in said first direction;

storing said first degree of rotation of said shaft in said microcomputer;

rotating said shaft in a second direction until said feeler pin contacts said second object;

measuring a second degree of rotation of said shaft with said encoder during said rotation in said second direction;

storing said second degree of rotation of said shaft in said microcomputer;

calculating a zero position for said feeler pin in between said first and second objects with said microcomputer based on said first and second degrees of rotation of said shaft; and rotating said shaft to said zero position.

2. The process of claim 1, wherein:

said zero position is calculated to be midway between said first and second objects.

3. The process of claim 1 further including the steps of:

positioning said feeler pin in between a third and a fourth of said objects having solid surfaces;

rotating said shaft in said first direction until said feeler pin contacts said third object;

measuring a third degree of rotation of said shaft with said encoder during said rotation of said feeler pin to contact said third object;

calculating with said microcomputer a first differential value equal to the difference between said third degree of rotation and said first degree of rotation;

rotating said shaft in said second direction until said feeler pin contacts said fourth object;

measuring a fourth degree of rotation of said shaft with said encoder during said rotation of said feeler pin to contact said fourth object;

calculating with said microcomputer a second differential value equal to the difference between said fourth degree of rotation and said second degree of rotation; and comparing with said microcomputer said first and second differential values to predetermined desired values and subsequently issuing a command signal.

* * * * *